US009963803B2

(12) United States Patent
Brandt

(10) Patent No.: US 9,963,803 B2
(45) Date of Patent: May 8, 2018

(54) APPARATUS FOR TEXTURIZING STRAND MATERIAL

(71) Applicant: OCV Intellectual Capital, LLC, Toledo, OH (US)

(72) Inventor: Luc J. L. Brandt, Henri-Chapelle (BE)

(73) Assignee: OCV Intellectual Capital, LLC, Toledo, OH (US)

( * ) Notice: Subject to any disclaimer, the term of this patent is extended or adjusted under 35 U.S.C. 154(b) by 285 days.

(21) Appl. No.: 14/356,891

(22) PCT Filed: Nov. 16, 2012

(86) PCT No.: PCT/US2012/065406
§ 371 (c)(1),
(2) Date: May 8, 2014

(87) PCT Pub. No.: WO2013/078074
PCT Pub. Date: May 30, 2013

(65) Prior Publication Data
US 2014/0302189 A1 Oct. 9, 2014

Related U.S. Application Data

(60) Provisional application No. 61/562,530, filed on Nov. 22, 2011.

(51) Int. Cl.
D01D 5/22 (2006.01)
D02G 1/16 (2006.01)
(Continued)

(52) U.S. Cl.
CPC ............ *D01D 5/22* (2013.01); *B29C 47/0014* (2013.01); *B29C 47/0016* (2013.01); *D02G 1/161* (2013.01); *D02J 1/08* (2013.01)

(58) Field of Classification Search
CPC .. D01D 5/22; B29C 47/0014; B29C 47/0016; D02G 1/161; D02J 1/08
(Continued)

(56) References Cited

U.S. PATENT DOCUMENTS 3,020,000 A * 2/1962 Morgan ...................... 242/360
3,823,450 A 7/1974 Ankudowicz et al.
(Continued)

FOREIGN PATENT DOCUMENTS

CN 85204341 U 6/1986
GB 2098244 11/1982

OTHER PUBLICATIONS

International Search Report and Written Opinion from PCT/US12/065406 dated Jul. 29, 2013.
(Continued)

*Primary Examiner* — Joseph S Del Sole
*Assistant Examiner* — John Robitaille
(74) *Attorney, Agent, or Firm* — Calfee, Halter & Griswold LLP

(57) ABSTRACT

A device for texturizing strand material into a wool-type product includes outer and inner nozzle sections. The outer and inner nozzle sections interface and define a passage through which the strand material travels. A locking device in the inner nozzle section is operable to selectively stop movement of the strand material. The locking device includes a seal holder that positions a sealing member within the inner nozzle section to prevent debris from entering the inner nozzle section, thereby promoting continued effective operation of the locking device. The outer nozzle section includes an end nozzle assembly including a hardened outlet tube. The hardened outlet tube is distinct from the outer nozzle section and, thus, can be repaired or replaced independently of the outer nozzle section.

13 Claims, 19 Drawing Sheets

SECTION A-A

(51) Int. Cl.
*D02J 1/08* (2006.01)
*B29C 47/00* (2006.01)

(58) Field of Classification Search
USPC .......................................................... 425/308
See application file for complete search history.

(56) References Cited

U.S. PATENT DOCUMENTS

| | | |
|---|---|---|
| 4,569,471 A | 2/1986 | Ingemansson et al. |
| 4,631,791 A | 12/1986 | Symon |
| 5,766,541 A | 6/1998 | Knutsson et al. |
| 5,976,453 A | 11/1999 | Nilsson et al. |
| 2010/0307632 A1 | 12/2010 | Nilsson et al. |

OTHER PUBLICATIONS

Substantive Examination Adverse Report from MY Application No. PI2014701290 dated Oct. 31, 2017.
Communication pursuant to Rules 161(1) and 162 EPC in EP Application No. 12791065.1 dated Jul. 1, 2014.
Office Action in CN Application No. 201280064198.9 dated Aug. 24, 2015.
Office Action in MX Application No. 14/06229 dated May 16, 2016.
Office Action in RU Application No. 2014124841 dated Oct. 3, 2016.
Notification of Reason for Rejection in JP Application No. 2014-543504 dated Nov. 24, 2016.

\* cited by examiner

SECTION A-A

SECTION A-A

SECTION B-B

APPARATUS FOR TEXTURIZING STRAND MATERIAL

RELATED APPLICATIONS

This application is the U.S. national phase entry of PCT/US2012/065406 with an international filing date of Nov. 16, 2012 which claims the benefit of provisional U.S. patent application Ser. No. 61/562,530 filed on Nov. 22, 2011 for APPARATUS FOR TEXTURING STRAND MATERIAL, the entire disclosure of which is fully incorporated herein by reference.

FIELD

The general inventive concepts relate generally to the production of a texturized strand material and, more particularly, to a device and method for producing the texturized strand material.

BACKGROUND

U.S. Pat. No. 5,976,453 to Nilsson et al. describes a device and process for expanding strand material into a wool-type product. Such texturized products are intended for use as acoustic and/or thermal insulation in automotive and industrial applications. The disclosed device is capable of expanding strand material into a wool-type product having a density of from about 30 grams/liter to about 69 grams/liter. Such low density wool-type products are desirable for use as sound absorbing material in engine exhaust mufflers, and as silencers for HVAC systems. Low density wool-type products may also be used in other thermal and acoustic insulation applications. The disclosed device is also capable of expanding strand material into a wool-type product having a density of from about 70 grams/liter to about 140 grams/liter. Such high density wool-type products are desirable for use as sound absorbing material in engine exhaust mufflers, and as silencers for HVAC systems. High density wool-type products may also be used in other thermal and acoustic insulation applications. The disclosed device represented an improvement over prior nozzles by requiring less compressed air, i.e., the flow rate of air going into the nozzle is less than that required by prior nozzles. As a result, fewer or lower capacity air compressors were required in a plant using the disclosed devices. Furthermore, it was possible to employ smaller tubing and regulators associated with the air compressors. Further still, a reduction of noise within the plant would likely result from the reduction in the quantity of compressed air used.

However, conventional texturizing devices, such as those disclosed in the '453 patent, suffer from drawbacks potentially affecting their efficiency and/or reliability.

For example, as shown in FIG. 1, a first texturizing device 10 of the '453 patent comprises an outer nozzle section 30 and an internal nozzle section 40. The outer nozzle section 30 has an entrance portion 32, an intermediate portion 34 and an exit portion 36. The exit portion 36 includes an intermediate nozzle segment 38 and an outer nozzle segment 39. The intermediate nozzle segment 38 is integral with the intermediate portion 34 of the outer nozzle section 30. The intermediate nozzle segment 38 is also integral with at least a portion of the outer nozzle segment 39. Consequently, damage to the outer nozzle segment 39 requires replacement of the entire outer nozzle section 30 to remedy the damage. Typically such damage will occur during manual operation of the device 10, for example, when a user drops the device 10 or inadvertently bumps the outer nozzle segment 39 against a hard surface.

Replacing the outer nozzle section 30 is a relatively costly proposition based on damage isolated to the outer nozzle segment 39. Furthermore, such an approach is often wasteful as the entire outer nozzle section 30 may be discarded, although the damage is isolated to a terminal region thereof (i.e., the outer nozzle segment 39). Further still, replacement of the outer nozzle section can require a relatively long period of time, during which the device 10 cannot be used. Thus, overall efficiency of the production process utilizing the device 10 is reduced.

As another example, as shown in FIGS. 2 and 3, a fourth texturizing device 400 of the '453 patent includes a strand material locking device 490 integral with a main body portion 442 of the device 400. The strand material locking device 490 comprises a cylinder portion 492, a piston 494 and a spring 495. The cylinder portion 492 includes a main body section 510 and a cylinder cap 520 which is threadedly secured to the main body section 510. The main body section 510 includes an inner cavity 512 and first and second bores 514 and 516. The piston 494 is located within the inner cavity 512 and is capable of reciprocating therein. The spring 495 is provided within the inner cavity 512 and biases the piston 494 upward toward the cylinder cap 520 (see FIG. 3).

The first bore 514 in the main body section 510 extends between and communicates with the inner cavity 512 and a passage 448a of a connector portion 448. In this embodiment, the strand material locking device 490 is axially displaced from the connector portion 448. The passage 448a is coupled to a gas stream source 70 including a hose 72 coupled to a compressor (not shown) and a fitting 74 provided at the end of the hose 74. Pressurized air is provided to the passage 448a by the source 70. The second bore 516 extends between and communicates with the inner cavity 512 and a first passage 446 through which the strand material 20 passes as it moves through the texturizing device 400. The passage 446 is shown including a first section 446a having a first diameter and a second section 446b having a second diameter which is less than the first diameter of the first section 446a. For example, the first diameter may be about 5 mm while the second diameter is about 4 mm. The first section 446a is provided with a larger diameter so as to allow joined or spliced strands to pass into and through the passage 446 without stopping.

The cylinder cap 520 includes a fluid inlet 522 which communicates with a pressurized fluid source 496. The pressurized fluid source 496 comprises an air compressor (not shown), a flow control valve (not shown), a hose 496a coupled to the compressor, and a fitting 496b provided at the end of the hose 496a. The fitting 496b is threadedly received in a portion of the fluid inlet 522. Pressurized air flows from the compressor through the hose 496a and the fitting 496b to the fluid inlet 522. From the inlet 522, the pressurized air passes into the inner cavity 512 causing the piston 494 to move downwardly against the spring 495 (see FIG. 2). As the piston 494 moves downwardly, a nose 494a of the piston 494 moves through the second bore 516 so as to engage the strand material 20. The nose 494a grips the strand material 20 and holds it stationary in the first passage 446. The fluid source 496 is caused to provide pressurized fluid to the inner cavity 512 just before the cutter is operated to cut the strand material 20. Once the strand material 20 has been severed, the fluid source 496 releases the pressurized air from the inner cavity 512, thereby allowing the spring 495 to return the piston 494 to its retracted position (see FIG. 3).

The nose 494a of the piston 494 has a first size and the second bore 516 has a second size which is larger than the first size. Hence, a gap $G_3$ exists between the second bore 516 and the piston nose 494a when the nose 494a is in its strand material engaging position (see FIG. 2). The gap $G_3$ provides a path for pressurized air entering the inner cavity 512 through the first bore 514 to exit the inner cavity 512. Thus, during a filling cycle, the pressurized air entering the inner cavity 512 through the first bore 514 and exiting through the gap $G_3$ prevents strand material 20 or portions of strand material 20 from entering the inner cavity 512. This prevents the locking device 490 from becoming inoperable due to a buildup of strand material 20 in the inner cavity 512. Such a buildup of material 20 might prevent the piston nose 494a from properly engaging the strand material 20 just before or during a cutting operation.

The use of the first bore 514 to convey pressurized air into the inner cavity 512 to prevent buildup of strand material 20 in the inner cavity 512 is dependent on the flow of the pressurized air. Consequently, the device 400 is not protected from strand material 20 or other debris entering the inner cavity 512 when the pressurized air is not being delivered to the inner cavity (i.e., when the gas stream source 70 is off or depleted), such as when the device 400 is off, idle, or otherwise in an inoperative state. By way of example, the inner cavity 512 is not protected from strand material 20 or other debris when a user is carrying the device 400 from one location to another. As another example, the inner cavity 512 is not protected from strand material 20 or other debris when the gas supply source is disconnected from the device 400.

Furthermore, since the pressurized air from the gas stream source 70 is also used to advance or otherwise move the strand material 20 through the device 400 (e.g., through the passage 446), the diversion of a portion of the pressurized air through first bore 514 as described above means that a greater quantity of pressurized air is required than would be needed for only moving the strand material 20. As a result, costs attributable to the pressurized air may be higher.

Further still, since the pressurized air flowing through the first bore 514 and into the inner cavity 512 exits the inner cavity 512 through the gap $G_3$, the pressurized air contacts the strand material 20 in the passage 446 (i.e., in the first passage 446a) at an angle substantially perpendicular to the passage 446. As a result, the pressurized air flowing through the gap $G_3$ impacts the strand material 20 in a direction perpendicular to its direction of movement through the passage 446, such that the pressurized air may urge the strand material 20 against a side of the passage 446. Consequently, the pressurized air contacting the strand material 20 at this angle and/or the resulting contact with the side of the passage 446 may prematurely compromise the integrity of the strand material 20. Furthermore, it may be more difficult to advance the strand material 20 through the passage 446 as a result of this crosscurrent of pressurized air.

In view of the above, the general inventive concepts provide an improved device and method for producing a texturized strand material.

SUMMARY

The general inventive concepts relate generally to the production of a texturized strand material and, more particularly, to a device and method for producing the texturized strand material.

In one exemplary embodiment, a device for texturizing a strand material is provided. The device comprises a nozzle body, a locking device, and a passage extending through said nozzle body. The passage extends from a first end of the nozzle body to a second end of the nozzle body. The passage is sized to allow a strand material to pass therethrough. The locking device is operable to be selectively placed in one of a first state and a second state, with the first state corresponding to said locking device being engaged to prevent movement of said strand material within said passage, and with the second state corresponding to said locking device being disengaged to allow movement of said strand material within said passage. The locking device includes a piston and a spring, which are both disposed within a cavity. A seal holder is also disposed within said cavity to fix a sealing member within said cavity. The sealing member at least partially prevents debris from entering said cavity from said passage.

In one exemplary embodiment, said strand material is a continuous glass fiber strand.

In one exemplary embodiment, said sealing member is an O-ring.

In one exemplary embodiment, said locking device is placed in said first state by commencing application of a pressurized fluid to said locking device. In one exemplary embodiment, said pressurized fluid is compressed air.

In one exemplary embodiment, said locking device is placed in said second state by halting application of a pressurized fluid to said locking device. In one exemplary embodiment, said pressurized fluid is compressed air.

In one exemplary embodiment, said cavity is formed in said nozzle body.

In one exemplary embodiment, said device further comprises a cutting device, wherein said cutting device is operable to sever said strand material.

In one exemplary embodiment, said device further comprises an outlet tube, which is removably attached to said nozzle body, wherein said strand material is operable to pass through said passage and said outlet tube before exiting said outlet tube as a texturized material.

In one exemplary embodiment, said outlet tube is harder than said nozzle body.

In one exemplary embodiment, said outlet tube is secured to said nozzle body by a set screw.

In one exemplary embodiment, a device for texturizing a strand material is provided. The device comprises a nozzle body, an outlet tube removably attached to said nozzle body, a locking device, and a passage extending through said nozzle body to said outlet tube. The locking device is operable to be selectively placed in one of a first state and a second state, with the first state corresponding to said locking device being engaged to prevent movement of said strand material within said passage and said outlet tube, and with the second state corresponding to said locking device being disengaged to allow movement of said strand material within said passage and said outlet tube. The strand material is operable to pass through said passage and said outlet tube before exiting said outlet tube as a texturized material.

In one exemplary embodiment, said outlet tube is harder than said nozzle body.

In one exemplary embodiment, said outlet tube is secured to said nozzle body by a set screw.

Other aspects, advantages, and features of the general inventive concepts will become apparent to those skilled in the art from the following detailed description, when read in light of the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which:

FIG. 4A is a perspective view of the texturizing apparatus. FIG. 4B is a front side elevational view of the texturizing apparatus. FIG. 4C is a rear side elevational view of the texturizing apparatus. FIG. 4D is a side elevational view in cross-section of the texturizing apparatus. FIG. 4E is a top plan view of the texturizing apparatus.

FIG. 8A is a perspective view of the seal holder. FIG. 8B is a side elevational view of the seal holder. FIG. 8C is a top plan view of the seal holder. FIG. 8D is a side elevational view in cross-section (along line A-A in FIG. 8C) of the seal holder. FIG. 8E is a side elevational view in cross-section (along line B-B in FIG. 8C) of the seal holder.

FIG. 10A is a perspective view of the texturizing apparatus. FIG. 10B is another perspective view of the texturizing apparatus.

DETAILED DESCRIPTION

Figure 1:
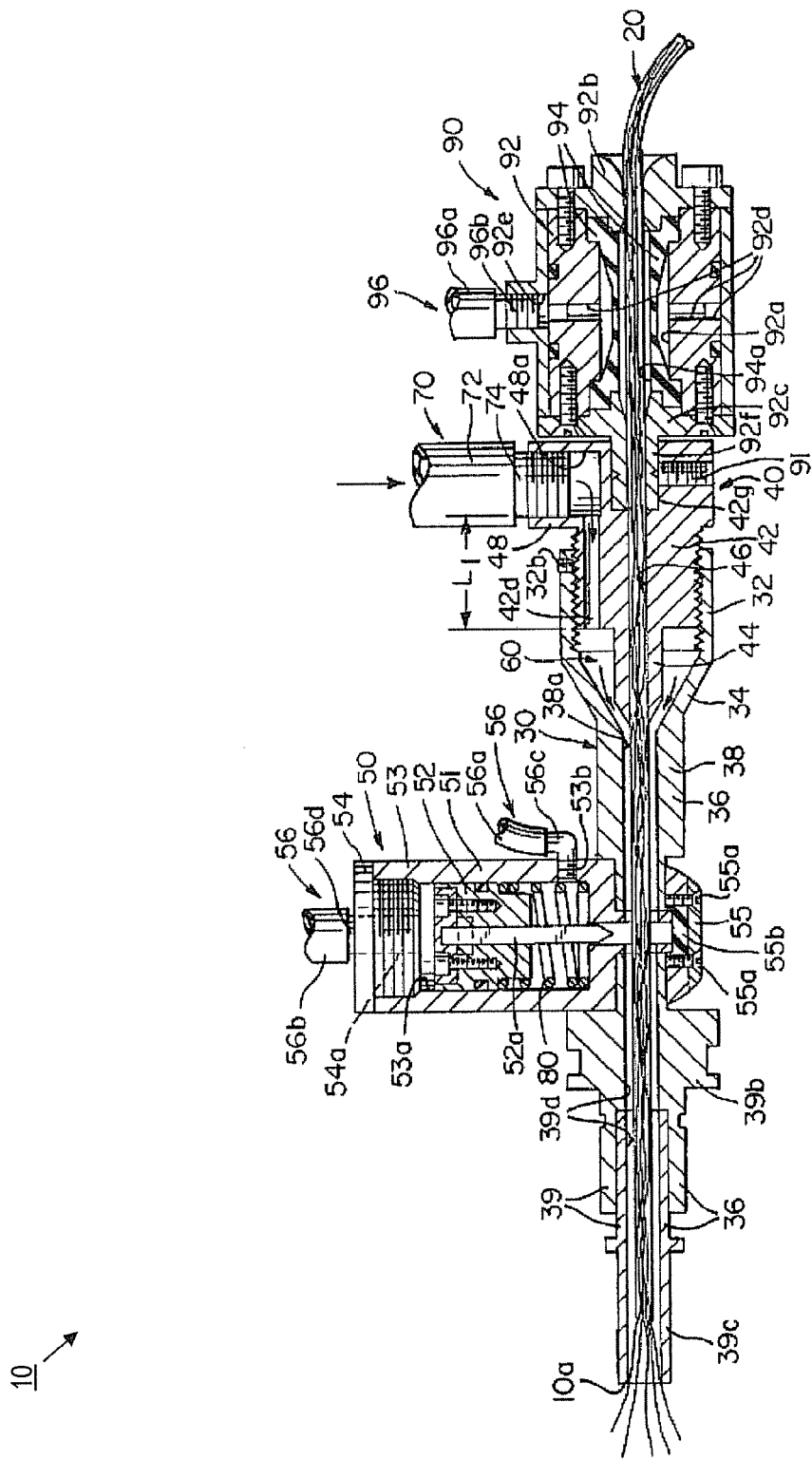
FIG. 1 is a side elevational view in cross-section of a first conventional texturizing apparatus.
Figure 2:
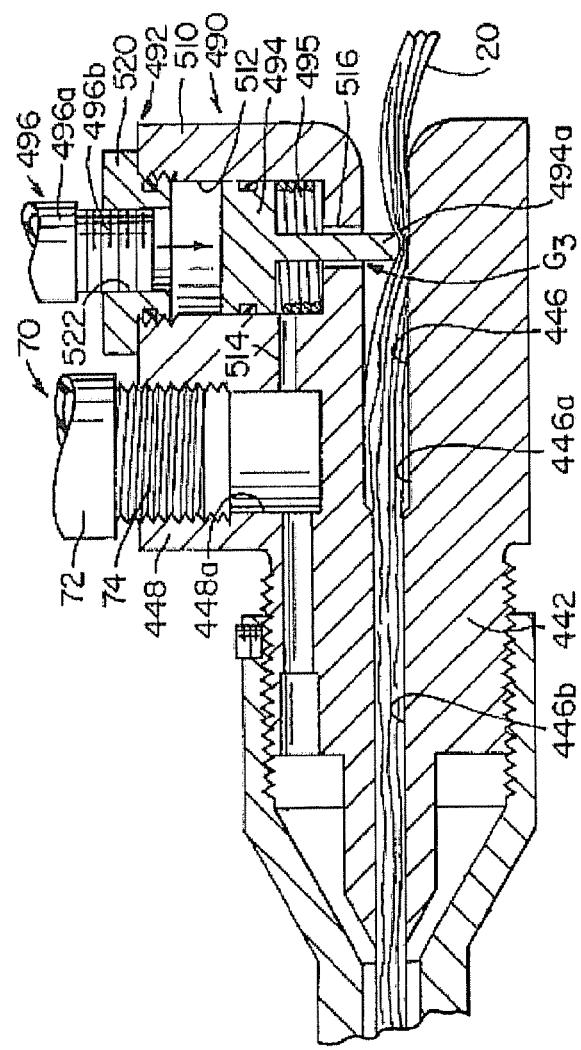
FIG. 2 is a side elevational view in cross-section of a second conventional texturizing apparatus.
Figure 3:
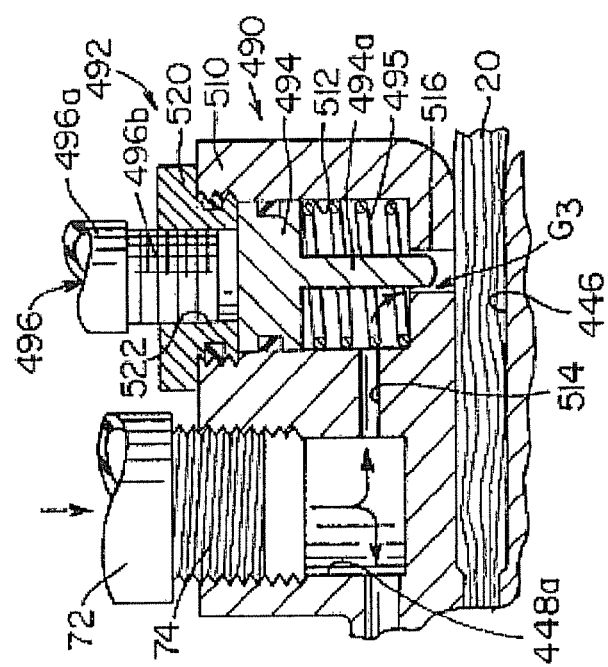
FIG. 3 is a detailed view of the texturizing apparatus of FIG. 2.

While the general inventive concepts are susceptible of embodiment in many different forms, there are shown in the drawings and will be described herein in detail various exemplary embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

A texturizing device 600, according to one exemplary embodiment, is shown in FIGS. 4A-4E. The texturizing device 600 represents an improvement over conventional texturizing devices, such as the texturizing devices disclosed in U.S. Pat. No. 5,976,453 to Nilsson et al., the disclosure of which is incorporated herein by reference in its entirety.

The texturizing device 600 comprises an inner nozzle section 602 and an outer nozzle section 604. At least a portion of the inner nozzle section 602 is sized and/or shaped to fit inside or otherwise interface with at least a portion of the outer nozzle section 604 (see FIG. 4D).

Figure 5:
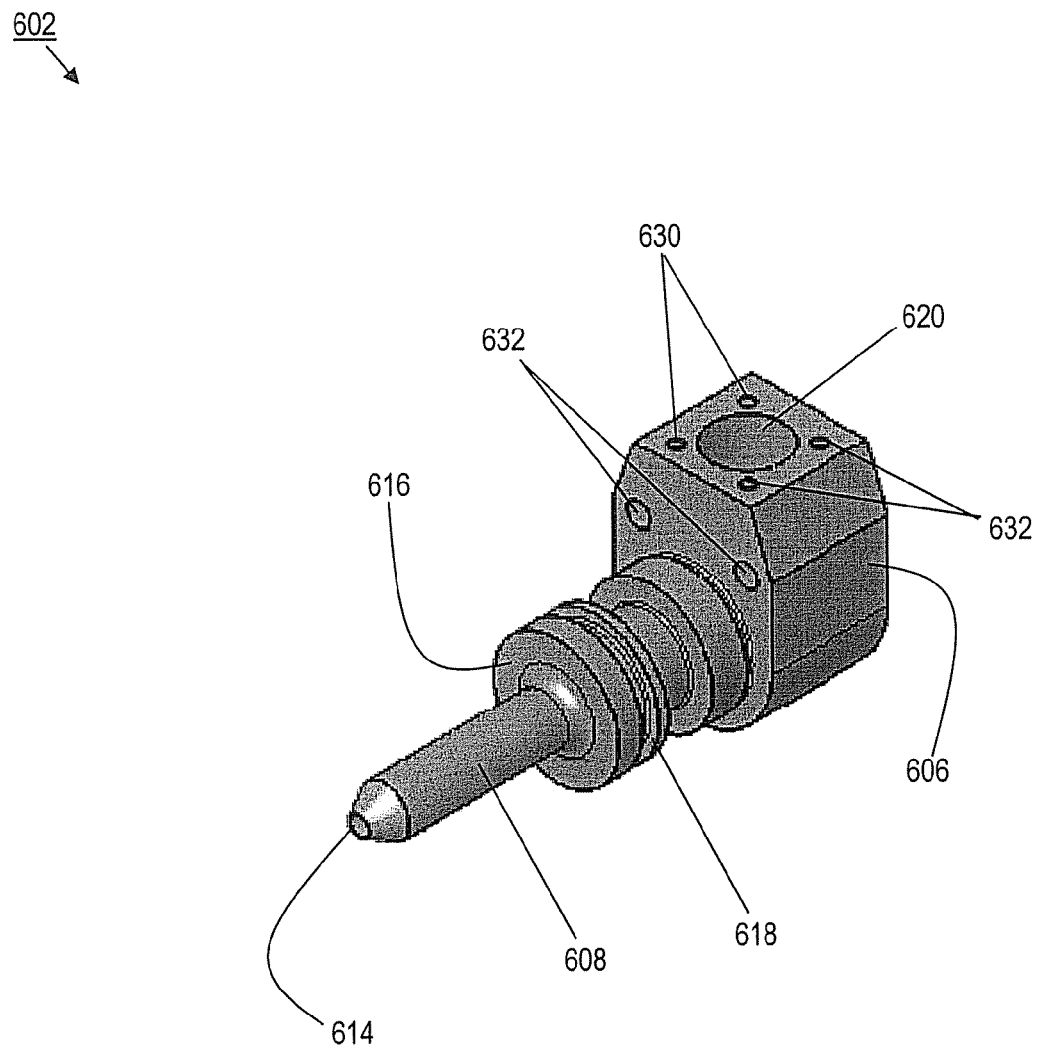
FIG. 5 is a perspective view of an inner nozzle section, according to one exemplary embodiment, for use in the texturizing apparatus of FIG. 1.

As shown in FIG. 5, the inner nozzle section 602 includes a main body 606 and a round, needle-like shaft 608 extending therefrom. A substantially linear first passage 610 for conveying a strand material extends through the main body 606 and the shaft 608. In particular, one end of the first passage 610 defines a strand inlet opening 612, while the opposite end of the first passage 610 defines a strand outlet opening 614.

The shaft 608 of the inner nozzle section 602 also includes a flange 616 housing a sealing member in the form of an O-ring 618 or the like. The O-ring 618 is operable to form an airtight seal between a portion of the inner nozzle section 602 positioned within the outer nozzle section 604 and an interior surface of the outer nozzle section 604 (see FIG. 4D). The flange 616 and its O-ring 618 are situated between the strand inlet opening 612 and the strand outlet opening 614.

The main body 606 of the inner nozzle section 602 includes a first bore 620 or other opening that extends from an upper surface of the main body 606 and into an inner cavity 622 of the main body 606. A floor of the inner cavity 622 includes an opening 624 therethrough which is smaller in size than the first bore 620. As a result, a shoulder 626 is formed at the floor of the inner cavity 622. The opening 624 in the floor of the inner cavity 622 connects the inner cavity 622 and the first passage 610.

A number of threaded holes 630 extend vertically down into the main body 606 (see FIG. 5). Here, vertically means substantially parallel to a central axis of the first bore 620. The holes 630 may be spaced around a circumference of the first bore 620 in any manner. In one exemplary embodiment, the holes 630 are spaced substantially evenly around a circumference of the first bore 620. In one exemplary embodiment, four holes 630 are formed in the main body 606. A number of threaded holes 632 extend horizontally into and through the main body 606. Here, horizontally means substantially parallel to a central axis of the shaft 608. In one exemplary embodiment, two holes 632 are formed in the main body 606. The purpose of the holes 630 and the holes 632 is described below.

Figure 4A:
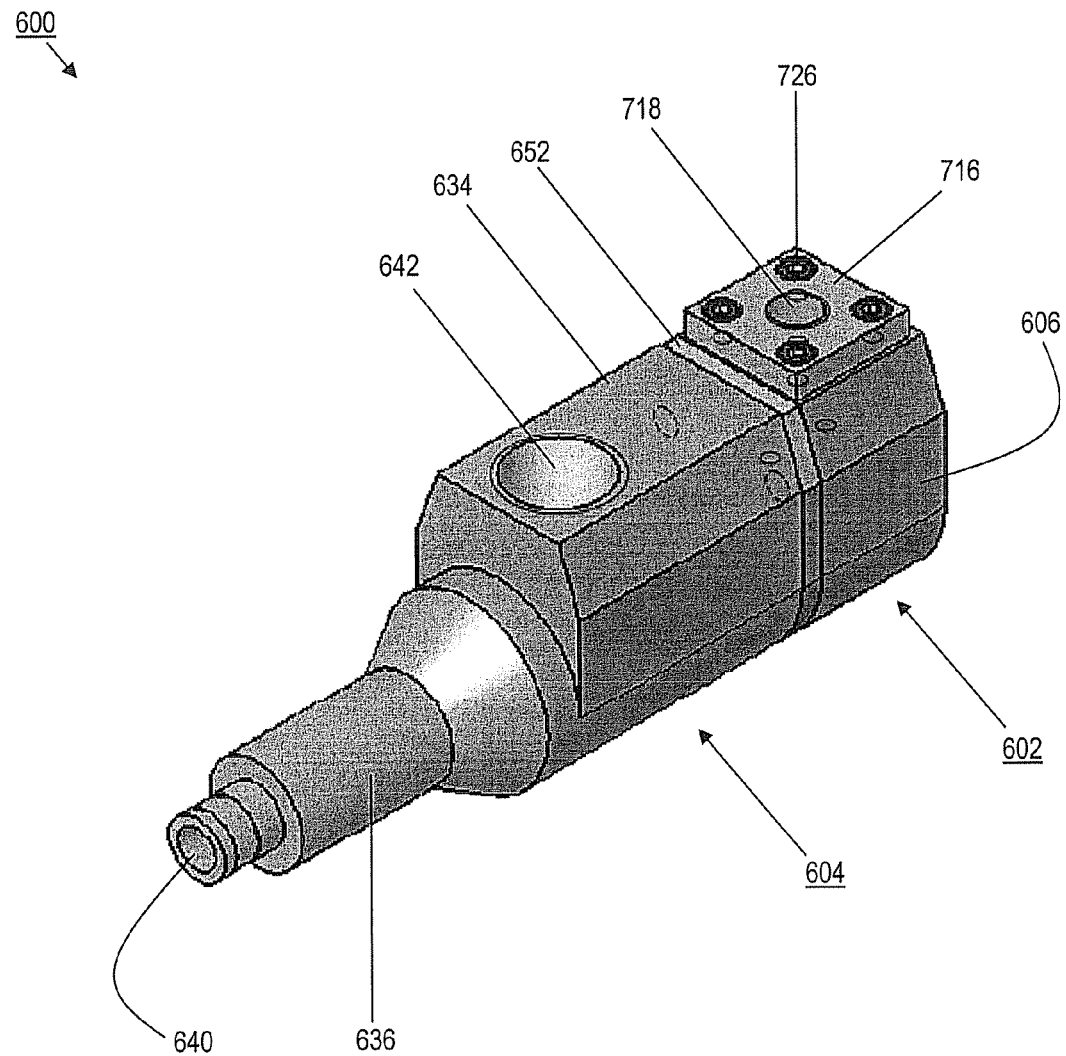
FIGS. 4A-4E illustrate a texturizing apparatus according to one exemplary embodiment.
Figure 4B:
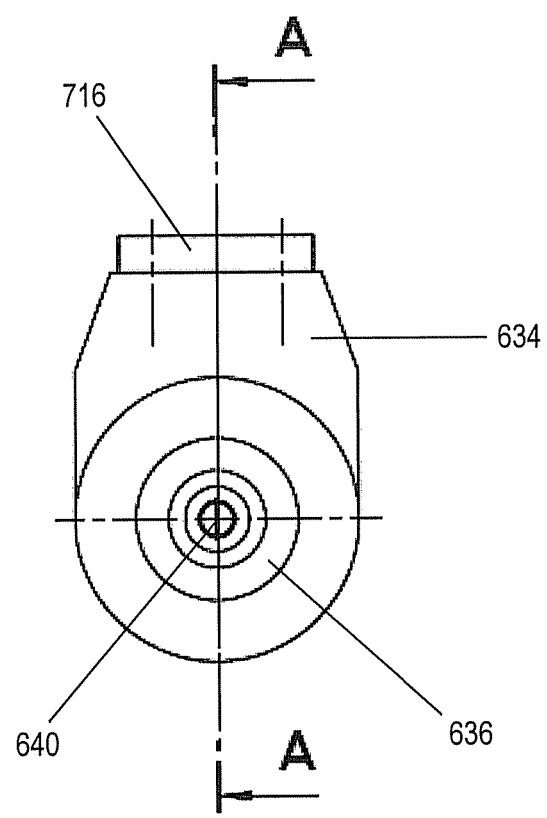
Figure 4C:
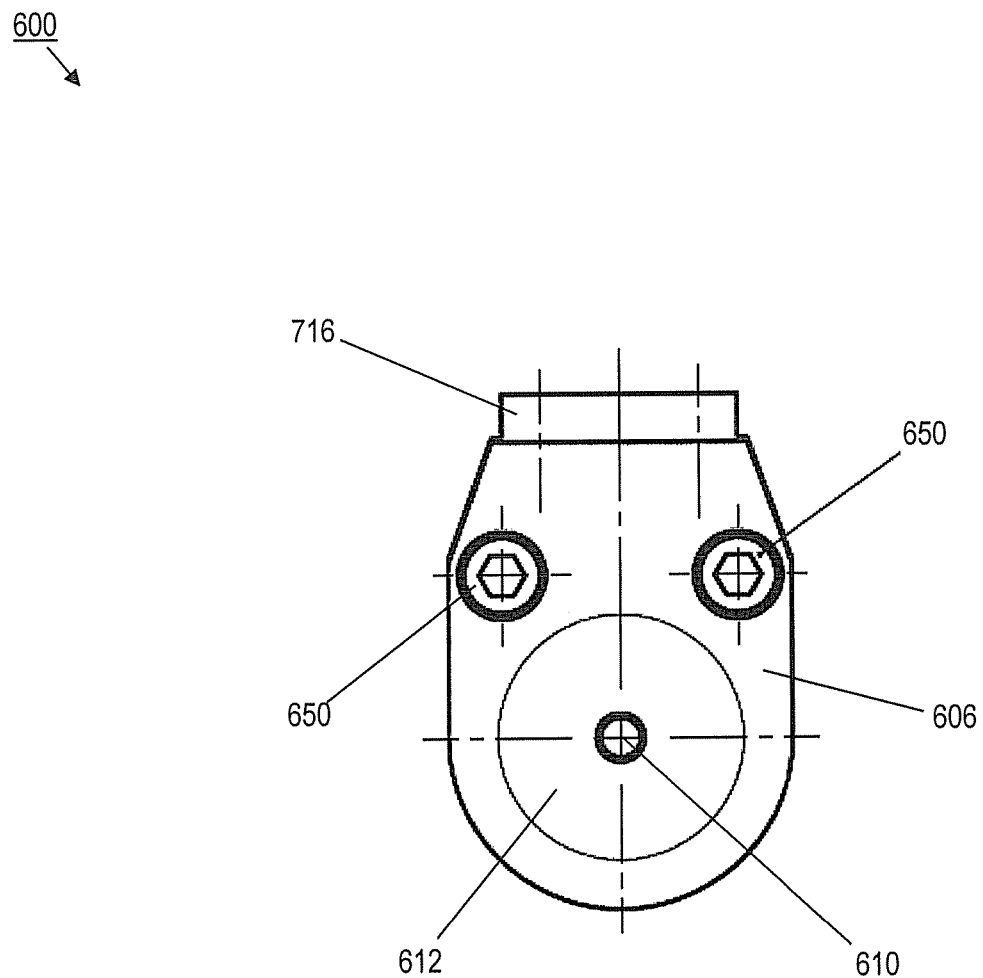
Figure 4D:
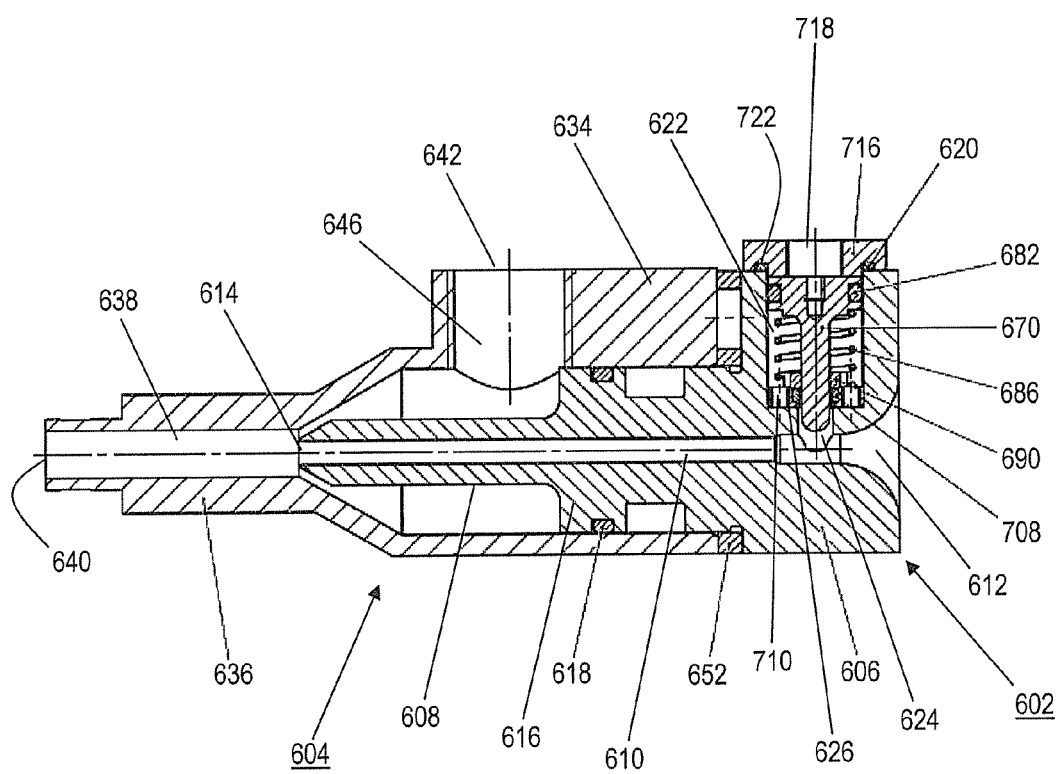
Figure 4E:
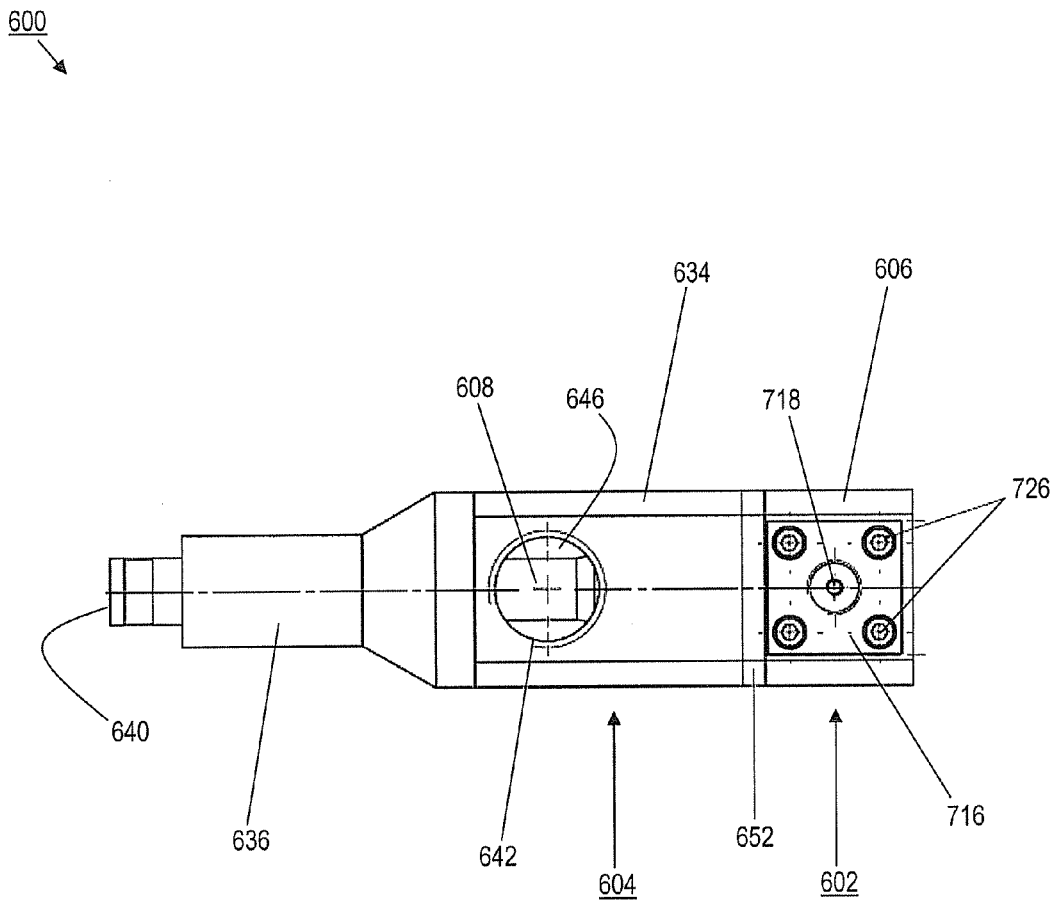

As shown in FIGS. 4A and 4D, the outer nozzle section 604 includes a main body 634 and a nozzle end portion 636 extending therefrom. The first passage 610 of the inner nozzle section 602 ends at or near the start of the nozzle end portion 636 of the outer nozzle section 604 (see FIG. 4D). Thus, as the strand material exits the first passage 610 through the strand outlet opening 614 of the inner nozzle section 606, the strand material then enters into a second passage 638 formed in the nozzle end portion 636 of the outer nozzle section 604. Ultimately, the strand material exits the nozzle end portion 636 of the outer nozzle section 604 through a nozzle outlet 640. By this time, the strand material has been transformed from a strand of material into a texturized form of the material, such as a wool-type product.

In a manual process, a user may manipulate the texturizing device 600 to place, discharge, or otherwise dispose the texturized material in a selected product and/or at a desired location. In an automated process, a machine (e.g., an industrial robot) may manipulate the texturizing device 600 to place, discharge, or otherwise dispose the texturized material in a selected product and/or at a desired location.

In one exemplary embodiment, the strand material is a continuous strand of reinforcement glass fiber strand. The term "glass fiber strand" as used herein shall mean a strand formed from a plurality of glass fibers. An example of such a strand is a commercially available roving having, for example, 4000 fibers. Such glass fiber strands are suitable for many applications. For example, the glass fiber strands are well suited for muffler applications, owing to their resistance to the high levels of heat produced in the interior of an engine exhaust muffler. The glass fiber strand can be formed from any suitable glass. In one exemplary embodiment, the glass fiber strand is formed from E-glass or S-glass type fibers. As another example, the glass fiber strands are well suited for industrial applications, such as thermal insulation for chimney ducts or venting systems. The general inventive concepts also contemplate that the strand material may comprise basalt fiber strands or fiber strands formed of other materials. The general inventive concepts also contemplate that the strand material may comprise two or more different materials. The general inventive concepts also contemplate that the strand material may include a coating.

The main body 634 of the outer nozzle section 604 includes a second bore 642 that extends from an upper surface of the main body 634 and into an inner cavity 646 of the main body 634. The inner cavity 646 substantially surrounds the shaft 608 of the inner nozzle section 602. A source of pressurized fluid (e.g., air) can be connected to or otherwise interfaced with the second bore 642, such as by a fitting (not shown). In this manner, the texturizing device 600 can deliver the pressurized fluid so that it flows through the second bore 642, the inner cavity 646, the second passage 638, and out the nozzle outlet 640.

As known in the art, the strand material (not shown) is moved through the first passage 610 and the second passage 638 at least in part by application of the pressurized fluid (e.g., air) applied to the strand material upstream of the strand outlet opening 614. As also known in the art, the pressurized fluid acts to separate and expand the filaments, fibers, or the like comprising the strand material, thereby forming a texturized material (e.g., a wool-type product) which noticeably expands in apparent volume as it exits the texturizing device 600.

As noted above, at least a portion of the inner nozzle section 602 fits inside at least a portion of the outer nozzle section 604 (see FIG. 4A). Thereafter, fasteners or the like, such as screws 650, are inserted through (e.g., screwed into) the holes 632 in the main body 606 of the inner nozzle section 602 to engage corresponding holes (not shown) formed in the main body 634 of the outer nozzle section 604, thereby securing the inner nozzle section 602 and the outer nozzle section 604 to each other.

Figure 6:
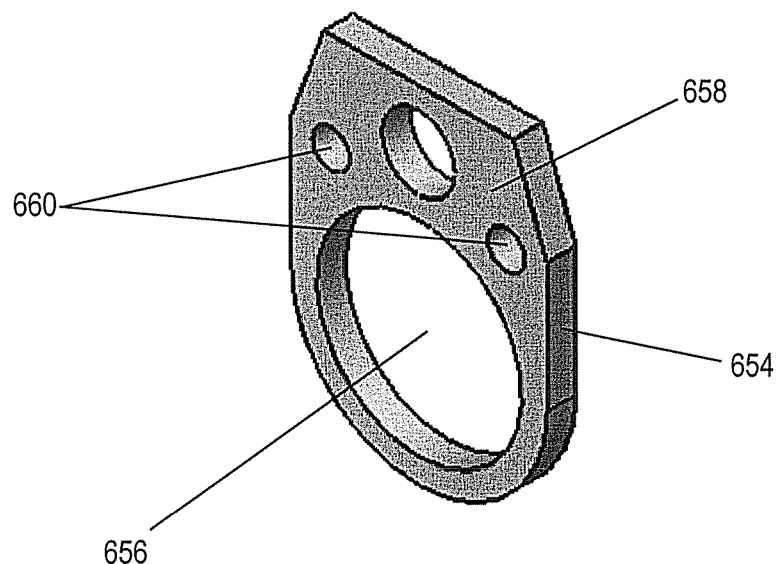
FIG. 6 is a perspective view of a spacing member (i.e., washer), according to one exemplary embodiment, for use in the texturizing apparatus of FIG. 1.

In one exemplary embodiment, a spacing member or similar structure, such as a washer 652 (see FIG. 6), is positioned between the inner nozzle section 602 and the outer nozzle section 604 prior to securing or otherwise fastening the inner nozzle section 602 and the outer nozzle section 604 together. The washer 652 includes a main body 654 having a central bore 656 or opening therethrough and a flange portion 658 adjacent the central bore 656. The flange portion 658 includes a pair of holes 660 that extend horizontally into and through the main body 654. Here, horizontally means substantially parallel to a central axis of the central bore 656.

The washer 652 facilitates proper spatial alignment, spacing, and the like between the inner nozzle section 602 and the outer nozzle section 604, as they are joined together. In one exemplary embodiment, the holes 660 in the washer 652 correspond to the holes 632 formed in the inner nozzle section 602 and the holes (not shown) formed in the outer nozzle section 604. In this manner, the screws 650 or other fasteners used to join the inner nozzle section 602 to the outer nozzle section 604 can also function to secure or otherwise hold the washer 652 in place.

As known in the art, the texturizing device 600 may include a cutting device or mechanism. The cutting device (i.e., cutter) is operable to cut or otherwise separate the continuous strand material (e.g., between filling operations or other use cycles).

It is also known in the art for a texturizing device, such as the texturizing device 600, to include a locking device or mechanism. The locking device is operable to selectively halt movement of the continuous strand material through the texturizing device 600 (e.g., through the passages 610 and 638).

Figure 9:
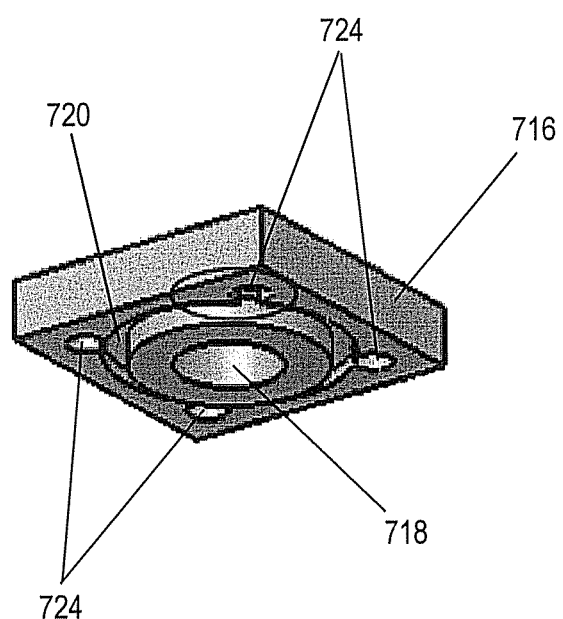
FIG. 9 is a perspective view of a cover, according to one exemplary embodiment, for use in the texturizing apparatus of FIG. 1.
Figure 10A:
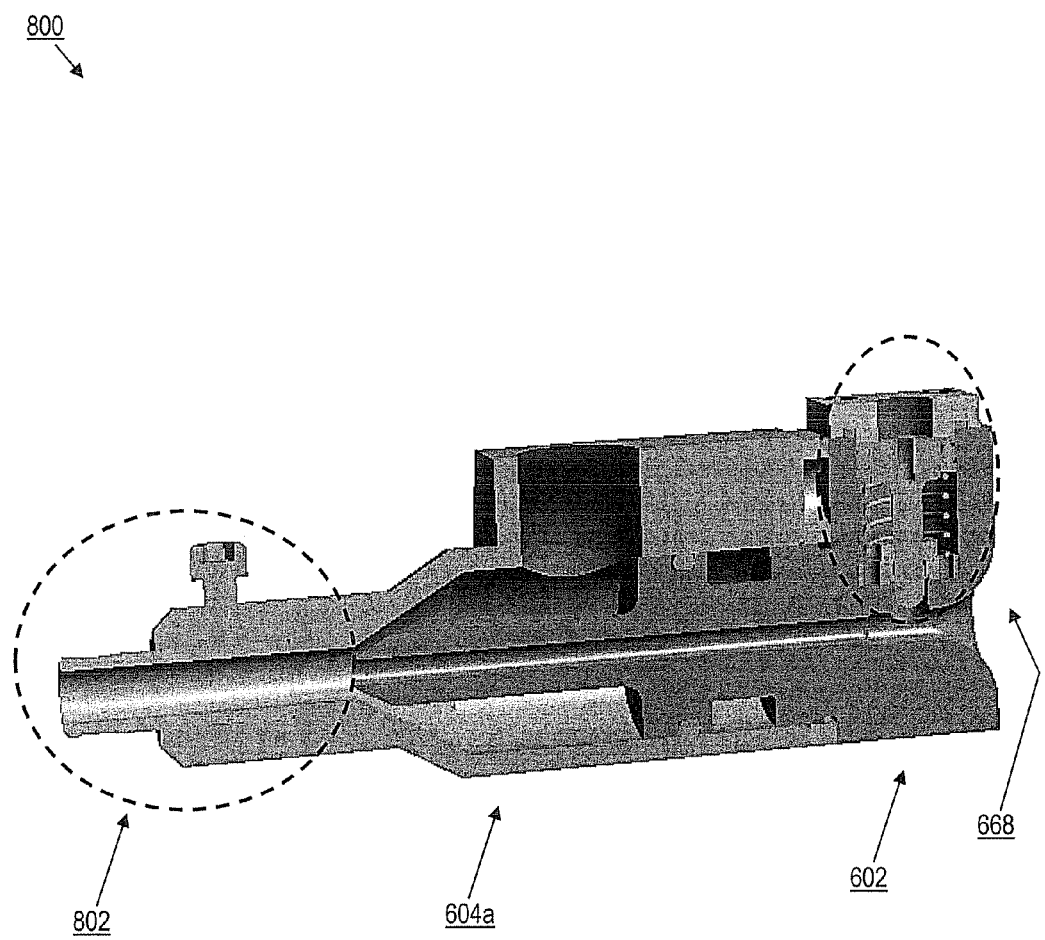
FIGS. 10A-10B illustrate a texturizing apparatus according to another exemplary embodiment.

As best shown in FIGS. 4D and 10A, the texturizing device 600 includes a locking device 668 coupled to the main body 606 of the inner nozzle section 602. In particular, the locking device 668 is primarily situated in the inner cavity 622 of the main body 606. The locking device 668 comprises a piston 670 (see FIG. 7), a compression spring 686 (see FIG. 4D) or other resilient member, a seal holder 690 (see FIGS. 8A-8E), and a cover 714 (see FIG. 9).

Figure 7:
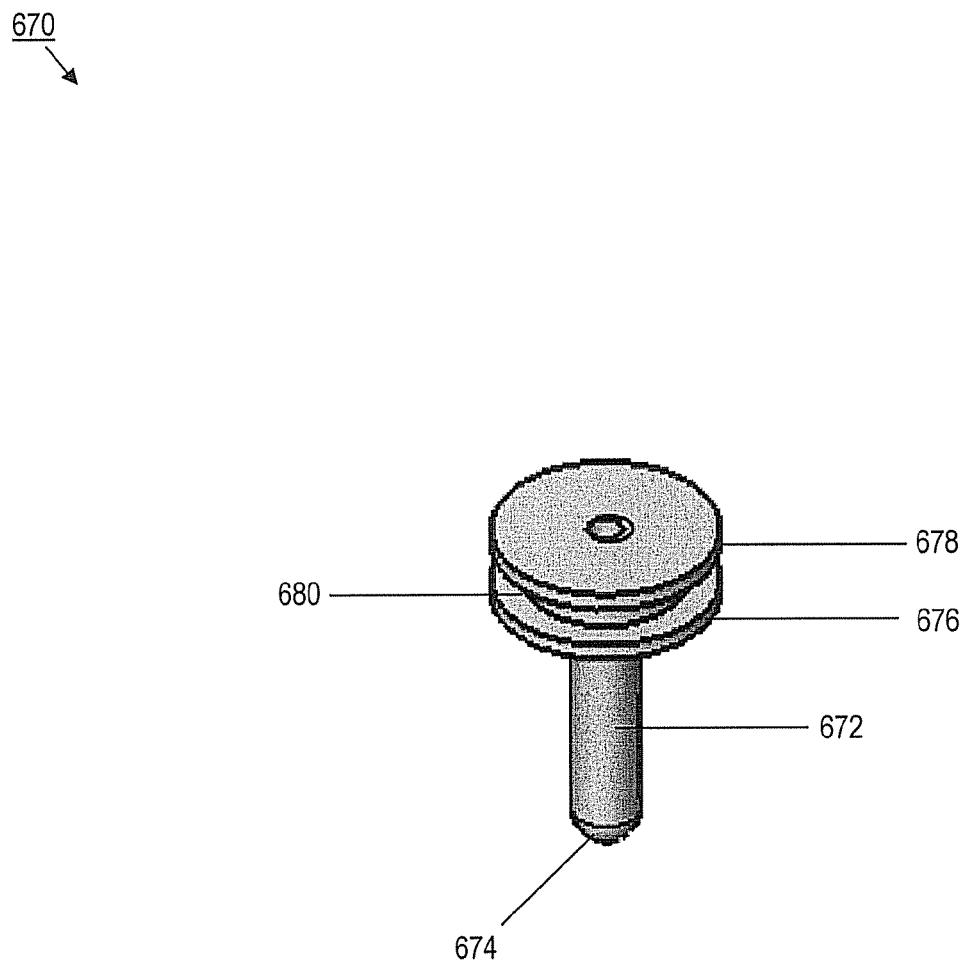
FIG. 7 is a perspective view of a piston, according to one exemplary embodiment, for use in the texturizing apparatus of FIG. 1.

The piston 670 of the locking device 668 is shown in FIG. 7. The piston 670 includes a shaft 672. One end of the shaft 672 forms a nose 674 of the piston 670. In one exemplary embodiment, the nose 674 differs in size and/or shape from the shaft 672. In one exemplary embodiment, the nose 674 is tapered or rounded. The other end of the shaft 672 is connected to (or formed integrally with) a lower flange 676 of the piston 670. An upper flange 678 of the piston 670 is spaced from the lower flange 676 so as to form a channel 680. The channel 680 of the piston 670 is operable to receive, house, or otherwise interface with a sealing member in the form of an O-ring 682 or the like.

The seal holder 690 of the locking device 668 is shown in FIGS. 8A-8E. The seal holder 690 includes an upper main body 692 formed integrally with a lower main body 694. An upper surface of the upper main body 692 forms an upper ledge 696 of the seal holder 690. Because the upper main body 692 has a smaller circumference than the lower main body 694 (see FIG. 8A), a lower ledge 698 is formed where the upper main body 692 and the lower main body 694 meet. A lower surface of the lower main body 694 is the lower surface 700 of the seal holder 690. Thus, a height of the seal holder 690 is measured from the upper ledge 696 to the lower surface 700.

Figure 8A:
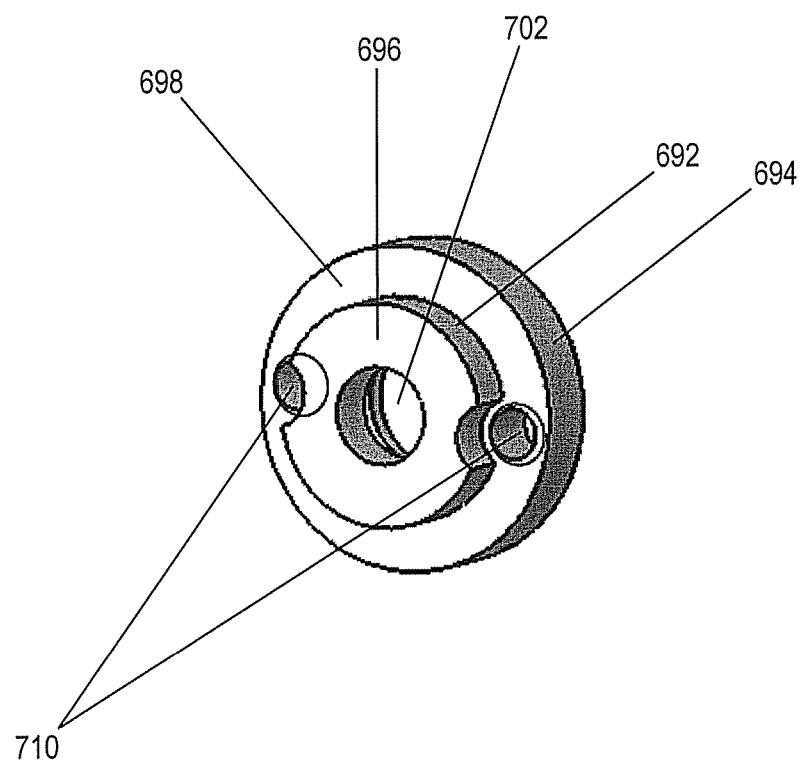
FIGS. 8A-8E illustrate a seal holder, according to one exemplary embodiment, for use in the texturizing apparatus of FIG. 1.
Figure 8B:
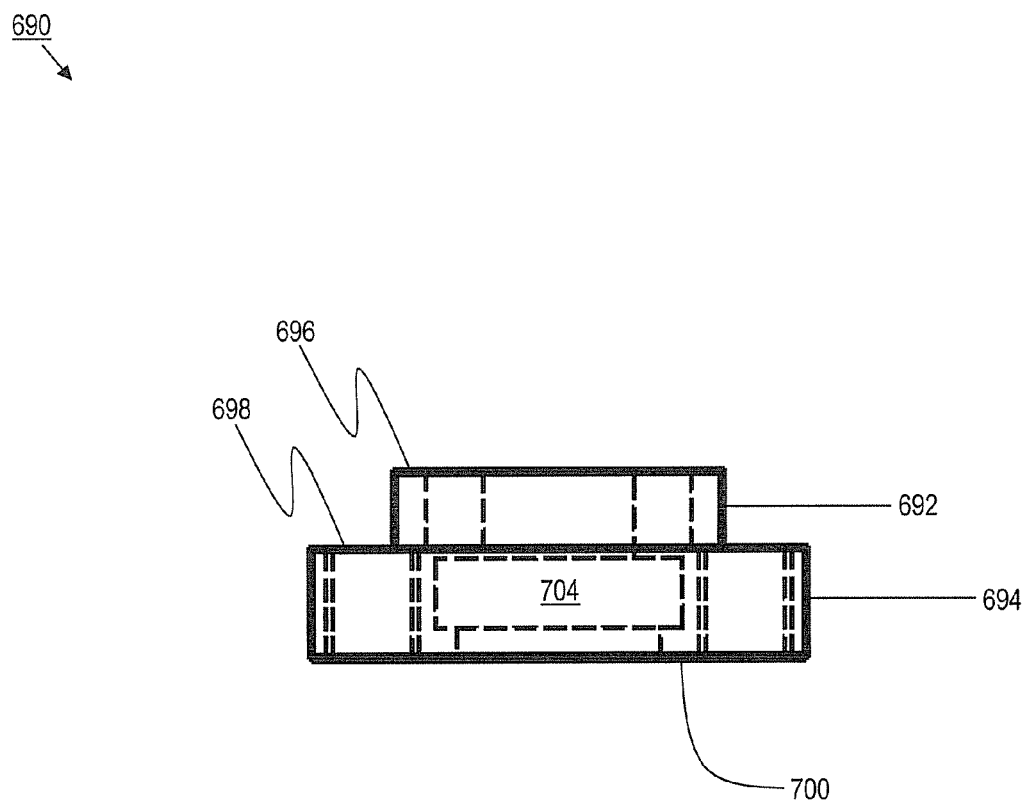
Figure 8C:
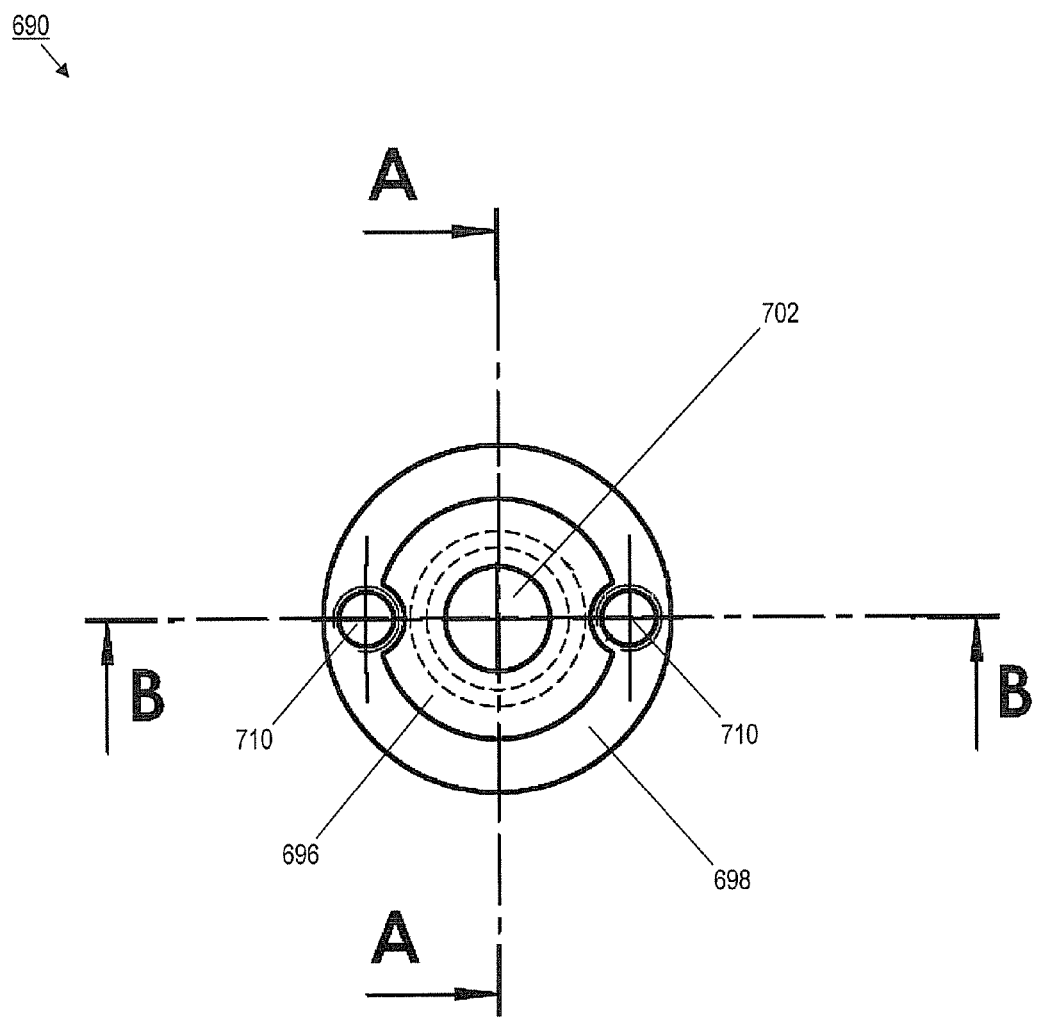
Figure 8D:
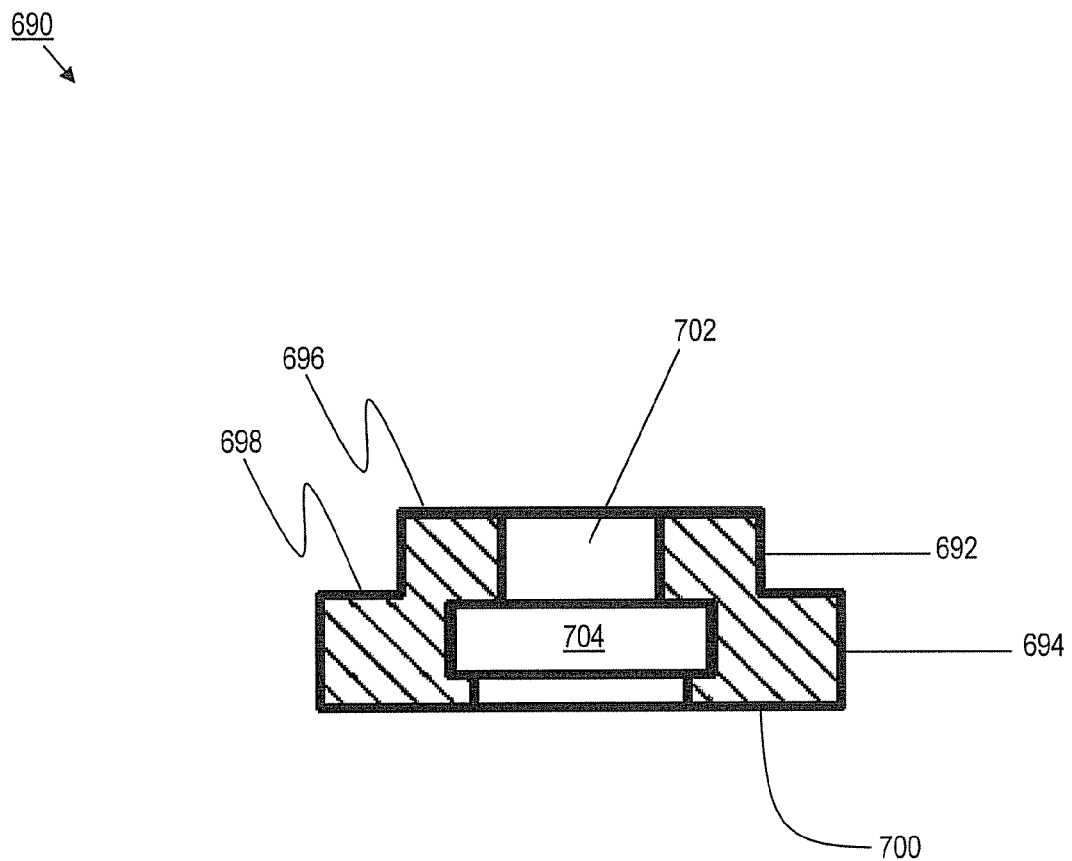
Figure 8E:
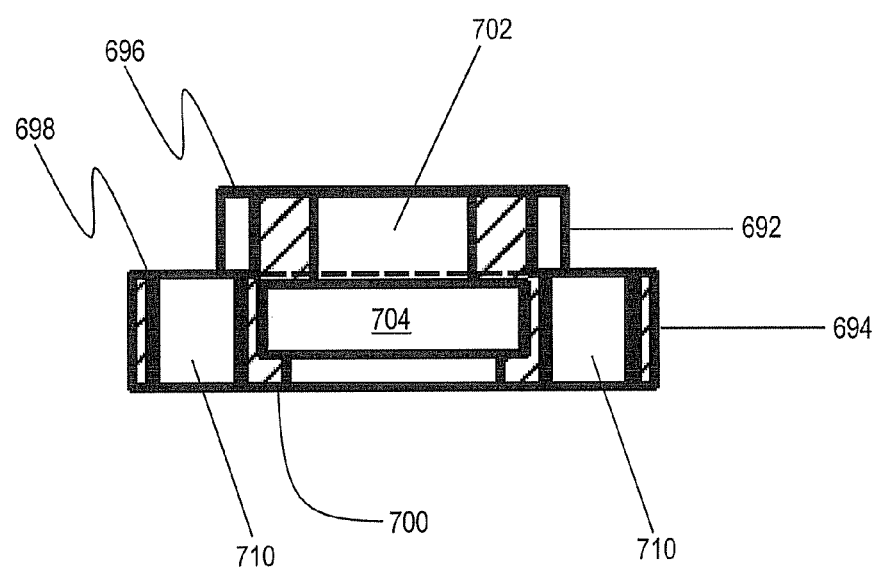

The seal holder 690 also includes a central opening 702 that extends through the upper main body 692 and the lower main body 694. As shown in FIGS. 8D-8E, a size (i.e., diameter) of the central opening 702 varies and is greatest between the upper ledge 696 and the lower surface 700, such that a seal cavity 704 is formed inside the seal holder 690. The seal cavity 704 is an annular space operable to receive, house, or otherwise interface with a sealing member in the form of an O-ring 708 or the like (see FIG. 4D). The size of the central opening 702 is sufficient large to allow the shaft 672 of the piston 670 to pass therethrough.

The seal holder 690 also includes a number of threaded holes 710 extending through the lower main body 694. In one exemplary embodiment, two holes 710 are formed in the lower main body 694 of the seal holder 690. In one exemplary embodiment, the holes 710 are evenly spaced around a circumference of the central opening 702 of the seal holder 690.

The holes 710 in the seal holder 690 correspond to holes (not shown) in the floor of the inner cavity 622 of the inner nozzle section 602. Thus, when the seal holder 690 is properly fit in the inner cavity 622, the lower surface 700 of the seal holder 690 comes to rest on the shoulder 626 of the main body 606. By manipulation (e.g., rotation) of the seal holder 690, the holes 710 in the seal holder 690 can be aligned with the holes in the floor of the inner cavity 622. Thereafter, fasteners or the like, such as screws (not shown), are inserted through (e.g., screwed into) the holes 710 in the seal holder 690 to engage the corresponding holes in the main body 606 of the inner nozzle section 602, thereby securing the seal holder 690 to the inner nozzle section 602.

The piston 670, the spring 686, and the seal holder 690 fit into the inner cavity 622 through the first bore 620 formed in the main body 606. Thereafter, the first bore 620 is sealed by the cover 714. The cover 714 attaches to or otherwise interfaces with the main body 606 to secure the piston 670, the spring 686, and the seal holder 690 within the inner cavity 622 of the inner nozzle section 602.

The cover 714 of the locking device 668 is shown in FIG. 9. The cover 714 includes a main body 716 with a central opening 718. An annular recess 720 is formed in the main body 716 and surrounds the central opening 718. The recess 720 of the cover 714 is operable to receive, house, or otherwise interface with a sealing member in the form of an O-ring 722 or the like (see FIG. 4D).

The main body 716 of the cover 714 is sized so as to completely occlude the first bore 620 of main body 606. When the cover 714 is properly fit on the main body 606, the central opening 718 of the cover 714 is aligned with or otherwise overlaps the first bore 620 in the main body 606.

The cover 714 also includes a number of threaded holes 724 extending through the main body 716. In one exemplary embodiment, four holes 724 are formed in the main body 716 of the cover 714. The holes 724 in the cover 714 correspond to the holes 630 in the main body 606 of the inner nozzle section 602. Thus, when the cover 714 is properly fit on the main body 606, the holes 724 and the holes 630 are aligned. Thereafter, fasteners or the like, such as screws 726, are inserted through (e.g., screwed into) the holes 724 in the main body 716 of the cover 714 to engage the corresponding holes 630 in the main body 606 of the inner nozzle section 602, thereby securing the cover 714 to the inner nozzle section 602 (see FIGS. 4A and 4E). The O-ring 722 allows for an airtight seal to be formed between the cover 714 and the main body 606 of the inner nozzle section 602, once the cover 714 is secured to the main body 606 (see FIG. 4D).

The piston 670 is sized and/or shaped so that it can reciprocate within the inner cavity 622. The O-ring 682 is operable to form an airtight seal between the piston 670 and an inner surface of the inner cavity 622. This airtight seal is maintained during reciprocation of the piston 670 within the inner cavity 622.

The spring 686 at least partially surrounds the shaft 672 of the piston 670. The spring 686 pushes against the lower flange 676 of the piston 670 to bias it toward the cover 714. In this manner, the normal tendency of the spring 686 is to urge the nose 674 of the piston 670 out of the first passage 610, so that the strand material may freely move through the first passage 610.

However, the normal tendency of the spring 686 may be overcome by application of a pressurized fluid (e.g., air) from a supply source (not shown) to the piston 670. In particular, the pressurized fluid is delivered through the central opening 718 in the cover 714 and through the first bore 620 of the main body 606, so that it impacts the upper flange 678 of the piston 670. For example, one or more hoses and/or fittings (not shown) may be used to connect or otherwise interface the supply source of the pressurized fluid to the texturizing device 600.

The force of the pressurized fluid (pressing on the upper flange 678 of the piston 670) is sufficient to push the piston 670 down within the inner cavity 622 so as to compress the compression spring 686. As a result, the shaft 672 of the piston 670 moves downward through the central opening 702 in the seal holder 690, which causes the nose 674 of the piston 670 to enter the first passage 610 and trap the strand material therein (e.g., against a wall of the first passage 610). In this manner, continued application of the pressurized fluid is operable to prevent movement of the strand material through the passages 610, 638.

Furthermore, because the shaft 672 of the piston 670 is sized to essentially seal the first passage 610, when the piston 670 is pressing down on the strand material, the likelihood of air flowing back through the first passage 610 (e.g., from a cutting device of the texturizing device 600) is reduced or prevented. In this manner, disengagement or disruption of the strand material in the first passage 610 is avoided.

If application of the pressurized fluid is stopped or otherwise interrupted, the compression spring 686 will return to its normal, relaxed state. As the compression spring 686 relaxes, it pushes on the lower flange 676 of the piston 670. As a result, the shaft 672 of the piston 670 moves upward through the central opening 702 in the seal holder 690, which causes the nose 674 of the piston 670 to exit the first passage 610 thereby freeing the strand material to resume its movement through the passages 610, 638.

Thus, by controlling application of the pressurized fluid, the locking device 668 of the texturizing device 600 can selectively halt movement of the strand material through the passages 610, 638, such as between filling operations or other use cycles.

Proper operation of the locking device 668, however, may be compromised if dirt, debris, contaminants, or the like enter the inner nozzle section 602 (i.e., the inner cavity 622 of the main body 606) of the texturizing device 600. For example, broken glass filaments or particles are likely to be present in the first passage 610 on occasion. Because the glass filaments typically include a size applied thereto, this debris may become sticky, gummy, or the like (e.g., from application of elevated temperatures) such that it adheres to surfaces within the texturizing device 600 and is not readily displaced. Also, moisture may form within or otherwise enter the first passage 610.

Since the first passage 610 is connected to the inner cavity 622 of the main body 606 by virtue of the opening 624 formed in the floor of the inner cavity 622, any debris in the first passage 610 is liable to enter the inner cavity 622 where it poses a risk to effective operation of the locking device 668. In particular, if the debris enters the inner cavity 622, it can cause (e.g., by the debris itself or a buildup of such occurring over time) the locking device 668 to cease working, to work less efficiently, to require more maintenance than usual, etc. Furthermore, as a result of these efficiency losses, costs are increased.

Accordingly, as noted above, the texturizing device 600 includes a seal holder 690 for securing a sealing member (i.e., the O-ring 708) in the inner cavity 622 of the main body 606. In particular, the O-ring 708 is situated near the opening 624 in the floor of the inner cavity 622 (see FIG. 4D). The seal holder 690 is secured to the main body 606, as described herein, to insure the O-ring 708 stays in place. The O-ring 708 works in conjunction with the piston 670 (i.e., the shaft 672 and/or the nose 674 of the piston 670) to keep debris from entering the inner cavity 622 through the opening 624. Indeed, the O-ring 708 functions to keep debris out of the inner cavity 622, even when the texturizing device 600 is idle (i.e., not being operated).

The O-ring 708 may be made of any material suitable to keep the debris from passing from the first passage 610 into the inner cavity 622. In one exemplary embodiment, the O-ring 708 is made of rubber. In one exemplary embodiment, the O-ring 708 is made of polyurethane. Oil or other materials and/or substances made be added to the O-ring 708 to increase its efficiency (e.g., enhance its sealing capability, prolong its usable life).

Furthermore, the texturizing device 600 facilitates maintenance and/or necessary repair of the components (i.e., the piston 670; the spring 686; the O-rings 682, 708, and 722; and the seal holder 690) of the locking device 668. In particular, the cover 714 is readily removable from the main body 606 of the inner nozzle section 602, such that the components can be readily accessed so that any necessary repair or replacement can be carried out in a timely manner. This insures that any downtime (i.e., the time in which the texturizing device 600 cannot be used) is minimized.

Figure 10B:
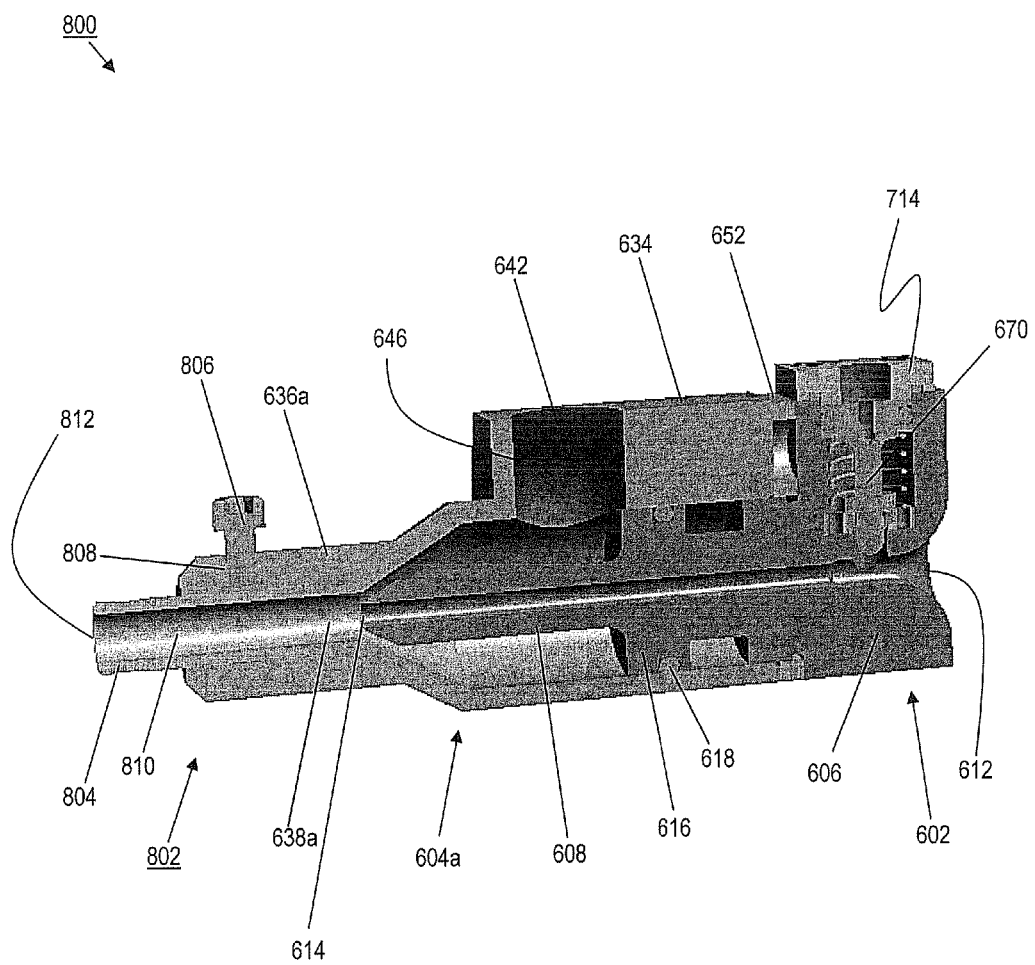

A texturizing device 800, according to one exemplary embodiment, is shown in FIGS. 10A-10B. The texturizing device 800 has features common to the texturizing device 600 described and illustrated herein and, thus, like reference numerals represent like elements. As shown in FIG. 10A, the texturizing device 800 includes a locking device 686 and an end nozzle assembly 802.

The texturizing device 800, for the most part, is structured like the texturizing device 600. However, the texturizing device 800 has a slightly different outer nozzle section 604a. The outer nozzle section 604a has a modified nozzle end portion 636a that is operable to interface with an end nozzle assembly 802 (see FIGS. 10A-10B). Accordingly, the nozzle end portion 636a has a different second passage 638a formed therein.

The end nozzle assembly 802 includes an outlet tube 804 for connecting to, attaching to, or otherwise interfacing with the nozzle end portion 636a. The outlet tube 804 is sized and/or shaped so that at least a portion of the outlet tube 804 readily fits inside the nozzle end portion 636a. As shown in FIGS. 10A-10B, a set screw 806 can extend through a hole 808 in the nozzle end portion 636a to exert a force against a portion of the outlet tube 804 inside the nozzle end portion 636a, thereby securing the outlet tube 804 within the nozzle end portion 636a.

In one exemplary embodiment, the outlet tube 804 screws into the nozzle end portion 636a. In one exemplary embodiment, the outlet tube 804 friction fits into the nozzle end portion 636a.

When the outlet tube 804 is secured in the nozzle end portion 636a, a third passage 810 defined by the outlet tube 804 is adjacent to and aligned with the second passage 638a formed in the nozzle end portion 636a.

Thus, during operation of the texturizing device 800, as strand material exits the first passage 610 through the strand outlet opening 614 of the inner nozzle section 606, the strand material then enters into the second passage 638a formed in the nozzle end portion 636a of the outer nozzle section 604a. The strand material then exits the second passage 638a in nozzle end portion 636a and enters into the third passage 810 formed in the outlet tube 804 of the end nozzle assembly 802. Ultimately, the strand material exits the third passage 810 through a nozzle outlet 812. By this time, the strand material has been transformed from a strand of material into a texturized form of the material, such as a wool-type product.

The outlet tube 804 extending from the outer nozzle section 604a is readily separable from the texturizing device 800 (i.e., the outer nozzle section 604a thereof), such that the outlet tube 804 can be removed and replaced with another outlet tube in a relatively short period of time. Furthermore, the outlet tube 804 can be designed and produced to have a relatively low cost as compared to the outer nozzle section 604a.

Thus, since damage to a texturizing device is often isolated to the area near the outlet portion, such as when a user inadvertently bangs the outlet portion of the texturizing device against another surface or object, the texturizing device 800 represents an improvement over conventional texturizing devices in that only the outlet tube 804 need be replaced if the damage is isolated to the outlet tube 804. As a result, considerable cost savings can be realized over time. Furthermore, as noted above, replacement of a damaged outlet tube 804 does not require much time or effort, such that the texturizing device 800 need not be out of commission for long when damage to the outlet tube 804 occurs.

Conversely, with conventional texturizing devices, even if damage is isolated to an outlet portion, typically the entire body or assembly integrated with the outlet portion must be replaced. This is wasteful and can be costly. Furthermore, since it may be difficult and/or time consuming to replace the entire integrated assembly, the texturizing device is likely to be inoperable for a significant period of time until the repair can be completed.

The outlet tube 804 of the end nozzle assembly 802 eliminates or reduces local internal stresses which appear when the main body 634 of the outer nozzle section 604a is manufactured and hardened. In particular, since the outlet tube 804 can be made with a sufficient hardness, the main body 634 and/or the nozzle end portion 636a can be made with a lower hardness.

The outlet tube 804 may be made of any material suitable to withstand the stresses associated with operation of a texturizing device (e.g., the texturizing device 800). As a result, the outlet tube typically has a relatively high hardness. In one exemplary embodiment, the outlet tube is made of stainless steel. In one exemplary embodiment, the outlet tube is made of stainless steel having a hardness of HRC 58/60. In one exemplary embodiment, the outlet tube is made of wolfram steel.

The outlet tube 804 may have any dimensions (e.g., diameter, length) suitable for allowing the strand material to be pulled through and processed by the texturizing device 600.

The above description of specific embodiments has been given by way of example. From the disclosure given, those skilled in the art will not only understand the general inventive concepts and their attendant advantages, but will also find apparent various changes and modifications to the structures and concepts disclosed. For example, although the exemplary embodiments described herein related to a texturizing device utilizing an improved locking device 668 and a texturing device utilizing the improved locking device 668 in combination with an end nozzle assembly 802, other combinations of these features are possible and fall within the general inventive concepts, such as a texturizing device that utilizes the end nozzle assembly 802 without the improved locking device 668. It is sought, therefore, to cover all such changes and modifications as fall within the spirit and scope of the general inventive concepts, as defined herein and by the appended claims, and equivalents thereof.

What is claimed is:

1. A device for texturizing a strand material, the device comprising:
   a nozzle body;
   a locking device; and
   a passage extending through said nozzle body,
   wherein said passage extends from a first end of the nozzle body to a second end of the nozzle body,
   wherein said passage is sized to allow a strand material to pass therethrough,
   wherein said locking device is operable to be selectively placed in one of a first state and a second state,
   wherein said first state corresponds to said locking device being engaged to prevent movement of said strand material within said passage,
   wherein said second state corresponds to said locking device being disengaged to allow movement of said strand material within said passage,
   wherein said locking device includes a piston and a spring disposed within a cavity,
   wherein a seal holder is disposed within said cavity to fix a sealing member within said cavity, and
   wherein said sealing member at least partially prevents debris from entering said cavity from said passage.

2. The device of claim 1, wherein said sealing member is an O-ring.

3. The device of claim 1, wherein said locking device is placed in said first state by commencing application of a pressurized fluid to said locking device.

4. The device of claim 3, wherein said pressurized fluid is compressed air.

5. The device of claim 1, wherein said locking device is placed in said second state by halting application of a pressurized fluid to said locking device.

6. The device of claim 5, wherein said pressurized fluid is compressed air.

7. The device of claim 1, wherein said cavity is formed in said nozzle body.

8. The device of claim 1, further comprising a cutting device, wherein said cutting device is operable to sever said strand material.

9. The device of claim 1, further comprising an outlet tube, wherein said outlet tube is removably attached to said nozzle body, and wherein said strand material is operable to pass through said passage and said outlet tube before exiting said outlet tube as a texturized material.

10. The device of claim 9, wherein said outlet tube is harder than said nozzle body.

11. The device of claim 9, wherein said outlet tube is secured to said nozzle body by a set screw.

12. The device of claim 1, further comprising:
    an outlet tube removably attached to said nozzle body,
    wherein said passage extends through said nozzle body to said outlet tube,
    wherein said first state corresponds to said locking device being engaged to prevent movement of said strand material within said passage and said outlet tube,
    wherein said second state corresponds to said locking device being disengaged to allow movement of said strand material within said passage and said outlet tube,
    wherein said strand material is operable to pass through said passage and said outlet tube before exiting said outlet tube as a texturized material, and
    wherein said outlet tube is harder than said nozzle body.

13. The device of claim 12, wherein said outlet tube is secured to said nozzle body by a set screw.

* * * * *